(12) United States Patent
Sodagar

(10) Patent No.: US 11,556,376 B2
(45) Date of Patent: Jan. 17, 2023

(54) SIGNALING TIMEOUT AND COMPLETE DATA INPUTS IN CLOUD WORKFLOWS

(71) Applicant: TENCENT AMERICA LLC, Palo Alto, CA (US)

(72) Inventor: Iraj Sodagar, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 68 days.

(21) Appl. No.: 17/233,788

(22) Filed: Apr. 19, 2021

(65) Prior Publication Data

US 2021/0406061 A1    Dec. 30, 2021

Related U.S. Application Data

(60) Provisional application No. 63/043,660, filed on Jun. 24, 2020, provisional application No. 63/087,755, filed on Oct. 5, 2020.

(51) Int. Cl.
*G06F 9/46* (2006.01)
*G06F 9/48* (2006.01)

(52) U.S. Cl.
CPC .................................. *G06F 9/485* (2013.01)

(58) Field of Classification Search
CPC combination set(s) only.
See application file for complete search history.

(56) References Cited

U.S. PATENT DOCUMENTS

| 9,430,280 B1 | 8/2016 | Shih et al. |
| 2007/0150329 A1 | 6/2007 | Brook et al. |
| 2008/0229307 A1 | 9/2008 | Maeda et al. |
| 2011/0145392 A1 | 6/2011 | Dawson et al. |
| 2020/0036798 A1 | 1/2020 | Dierckens et al. |

OTHER PUBLICATIONS

International Search Report dated Aug. 12, 2021 in International Application No. PCT/US21/31027.
Written Opinion of the International Searching Authority dated Aug. 12, 2021 in International Application No. PCT/US21/31027.
"Text of ISO/IEC FDIS 23090-8 Network-based media processing", Systems Subgroup, ISO/IEC JTC1/SC29/WG11, N19062, Jan. 2020 (Date of Document Apr. 28, 2020), 105 pages, Brussels, BE.

*Primary Examiner* — Gregory A Kessler
(74) *Attorney, Agent, or Firm* — Sughrue Mion, PLLC

(57) ABSTRACT

There is included a method and apparatus comprising computer code configured to cause a processor or processors to perform obtaining an input of at least one of a task and a workflow, setting a timeout for the input of the at least one of the task and the workflow, determining whether the at least one of the task and the workflow observes a lack of data of the input for a duration equal to the timeout, determining, in response to determining that the at least one of the task and the workflow observed the lack of data of the input for the duration equal to the timeout, an unavailability of further data of the input, applying an update to the at least one of the task and the workflow based on determining the unavailability, and processing the at least one of the task and the workflow.

15 Claims, 10 Drawing Sheets

800

SIGNALING TIMEOUT AND COMPLETE DATA INPUTS IN CLOUD WORKFLOWS

CROSS REFERENCE TO RELATED APPLICATION

The present application claims priority both to provisional application U.S. 63/043,660 filed on Jun. 24, 2020 and also to provisional application U.S. 63/087,755 filed on Oct. 5, 2020 which are hereby expressly incorporated by reference, in their entirety, into the present application.

BACKGROUND

1. Field

The present disclosure is directed to association of the network based media processing (NBMP) workflow with its functions' input and outputs and for signaling timeout of input data or completion of input data in cloud workflows.

2. Description of Related Art

MPEG NBMP project has developed a concept of processing media on the cloud. However, current NBMP design has a technical problem in lacking an ability to measure a quality of dividing a workflow among different network entities, MPEs, sources, or sinks.

The NBMP Draft International Specification shows a great potential to increase media processing efficiency, faster and lower-cost deployment of media services, and ability to provide large scale deployment by leveraging the public, private or hybrid cloud services.

Even if an NBMP specification defines idle and running states for tasks and workflows, such specification lacks how the change can occur. Accordingly, there is a technical problem in lacking a defining status of each input of a task or workflow and identifying any condition for changing its state. As such, a task or workflow is not able to decide whether the data in its input is complete or not, and a task or workflow doesn't have any rule for deciding whether the data is stopped.

Further, even if a network and cloud platform may be used to run various applications. The NBMP standard defines Workflow Description to define the processing required without providing a one-to-one mapping of the workflow input and outputs to its functions input and outputs.

While a current NBMP Workflow Description may provide a detailed description of a workflow including the possible workflow directed acyclic graph (DAG), such description lacks an associating of the workflow input and output description to the individual function's inputs or outputs.

Further, it may not be clear which input of the workflow is associated with a specific function instance's input and which output of the workflow is associated to a specific function instance's output. This is due to the fact that the connection-map only defines the connections between functions and not between function instances and the Workflow's inputs/outputs.

If the Workflow inputs/outputs are different, among all first or last functions, then the Workflow Manager can find the association due to the uniqueness of each input/output between all inputs/output. But if the Workflow includes multiple inputs/outputs with the same description (which only differ in their stream-id), then there is an ambiguity to identify the right function input/output for a Workflow's input/output.

In other words, there is an ambiguity of assigning the workflow inputs and outputs to specific functions inputs and outputs among the other technical problems described above.

SUMMARY

To address one or more different technical problems, this disclosure provides technical solutions to reduce network overhead and server computational overheads while delivering immersive video with respect to one or more viewport margin updates according to exemplary embodiments.

There is included a method and apparatus comprising memory configured to store computer program code and a processor or processors configured to access the computer program code and operate as instructed by the computer program code. The computer program code includes obtaining code configured to cause the at least one processor to obtain an input of at least one of a task and a workflow in NBMP, setting code configured to cause the at least one processor to set a timeout for the input of the at least one of the task and the workflow, determining code configured to cause the at least one processor to determine whether the at least one of the task and the workflow observes a lack of data of the input for a duration equal to the timeout, such that the determining code is further configured to cause the at least one processor to determine, in response to determining that the at least one of the task and the workflow observed the lack of data of the input for the duration equal to the timeout, an unavailability of further data of the input, and there may also be applying code configured to cause the at least one processor to apply an update to the at least one of the task and the workflow in NBMP based on determining the unavailability of further data of the input, and processing code configured to cause the at least one processor to process the at least one of the task and the workflow in NBMP based on the update.

According to exemplary embodiments, the determining code is further configured to cause the at least one processor to determine, whether a state of the at least one of the task and the workflow is set to a running state, and the determining code is further configured to cause the at least one processor to determine, in a case where it is determined that the state is set to the running state, whether to change the state from the running state to an idle state based on whether the at least one of the task and the workflow observes the lack of data of the input for a duration equal to the timeout.

According to exemplary embodiments, the determining code is further configured to cause the at least one processor to determine whether the input of the at least one of the task and the workflow is to be associated to at least one of an input and an output of a function, and the computer program code further comprises associating code configured to cause the at least one processor to associate, in response to determining that the input of the at least one of the task and the workflow is to be associated with the at least one of the input and the output of the function, the input of the at least one of the task and the workflow with the at least one of an input and an output of a function.

According to exemplary embodiments, wherein the determining code is further configured to cause the at least one processor to determine whether the input comprises an indication, and the determining code is further configured to cause the at least one processor to determine, in response to determining that the input comprises the indication, the unavailability of further data of the input.

According to exemplary embodiments, the indication comprises a complete input flag included with the input of the at least one of the task and the workflow.

According to exemplary embodiments, the indication is included in metadata provided with the input of the at least one of the task and the workflow.

According to exemplary embodiments, the obtaining code is further configured to cause the at least one processor to obtain a plurality of inputs, including the input, of the at least one of the task and the workflow, the determining code is further configured to cause the at least one processor to determine whether a state of the at least one of the task and the workflow is set to a running state, the determining code is further configured to cause the at least one processor to determine whether all of the inputs of the at least one of the task and the workflow observes the lack of data of all of the inputs for the duration equal to the timeout, and the determining code is further configured to cause the at least one processor to determine, in a case where it is determined that the state is set to the running state, whether to change the state from the running state to an idle state based on whether the at least one of the task and the workflow observes the lack of data of the input for a duration equal to the timeout for all of the inputs.

According to exemplary embodiments, determining whether all of the inputs of the at least one of the task and the workflow observes the lack of data of all of the inputs for the duration equal to the timeout comprises determining whether at least one of the inputs of the at least one of the task and the workflow indicates any of a timeout indication and a complete indication.

According to exemplary embodiments, wherein the determining code is further configured to cause the at least one processor to determine whether each of the inputs of the at least one of the task and the workflow is to be respectively associated to at least one of inputs and outputs of one or more functions respectively, and the computer program code further comprises associating code configured to cause the at least one processor to respectively associate, based on determining whether each of the inputs of the at least one of the task and the workflow is to be respectively associated to at least one of inputs and outputs of one or more functions respectively, the inputs of the at least one of the task and the workflow with the at least ones of the inputs and the outputs of the one or more functions.

According to exemplary embodiments determining whether each of the inputs of the at least one of the task and the workflow is to be respectively associated to at least one of inputs and outputs of one or more functions respectively comprises determining at least ones of an identification and a port name for each of the inputs of the at least one of the task and the workflow and at least ones of a corresponding port name and a stream identification of at least ones of a corresponding input port and output port.

BRIEF DESCRIPTION OF THE DRAWINGS

Further features, nature, and various advantages of the disclosed subject matter will be more apparent from the following detailed description and the accompanying drawings in which.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
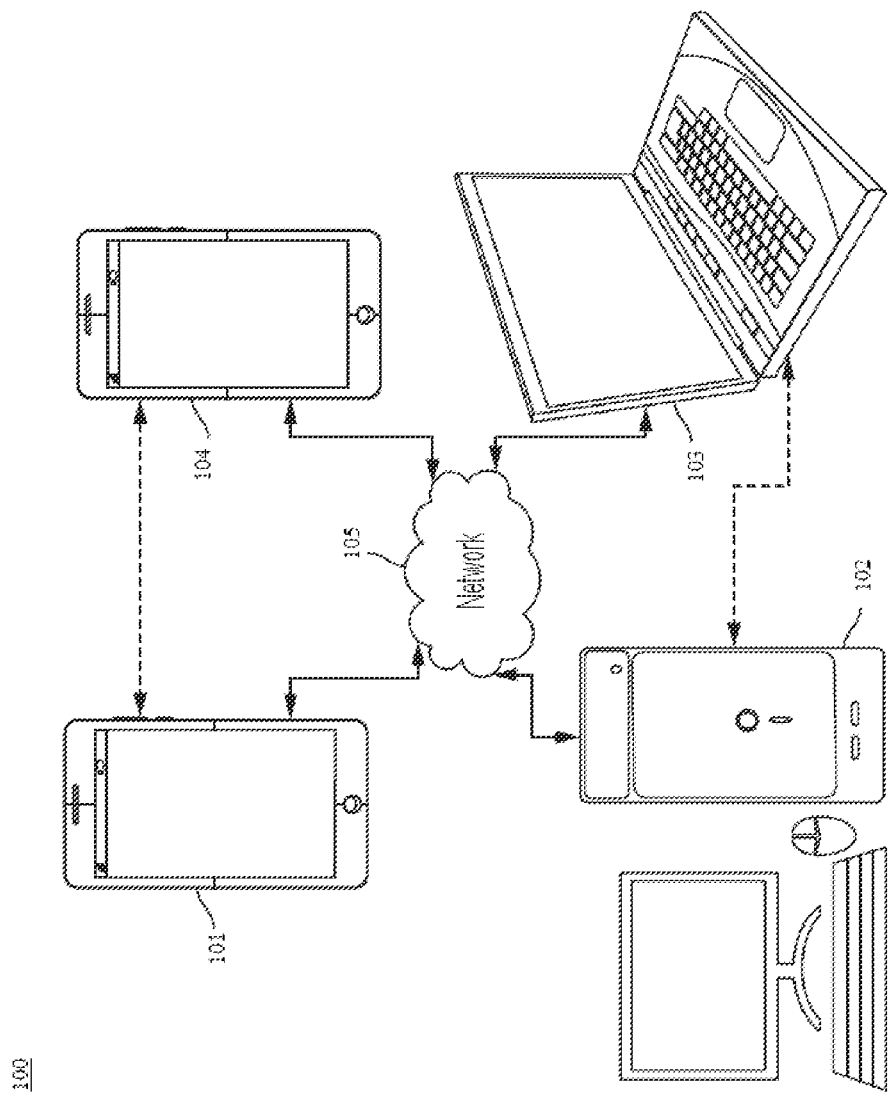
FIG. 1 is a simplified schematic illustration in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
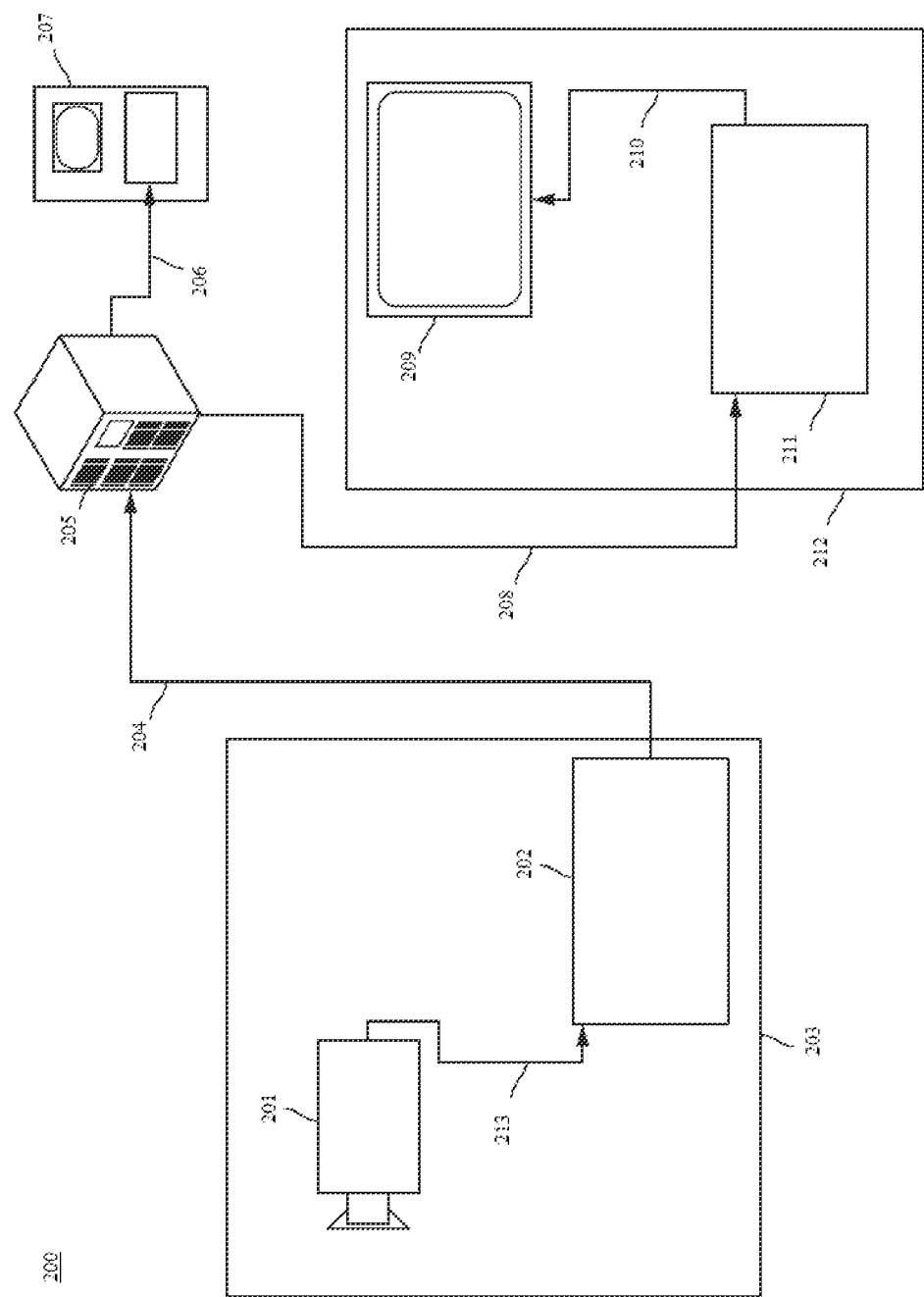
FIG. 2 is a simplified schematic illustration in accordance with embodiments.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the camera 201. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

Figure 3:
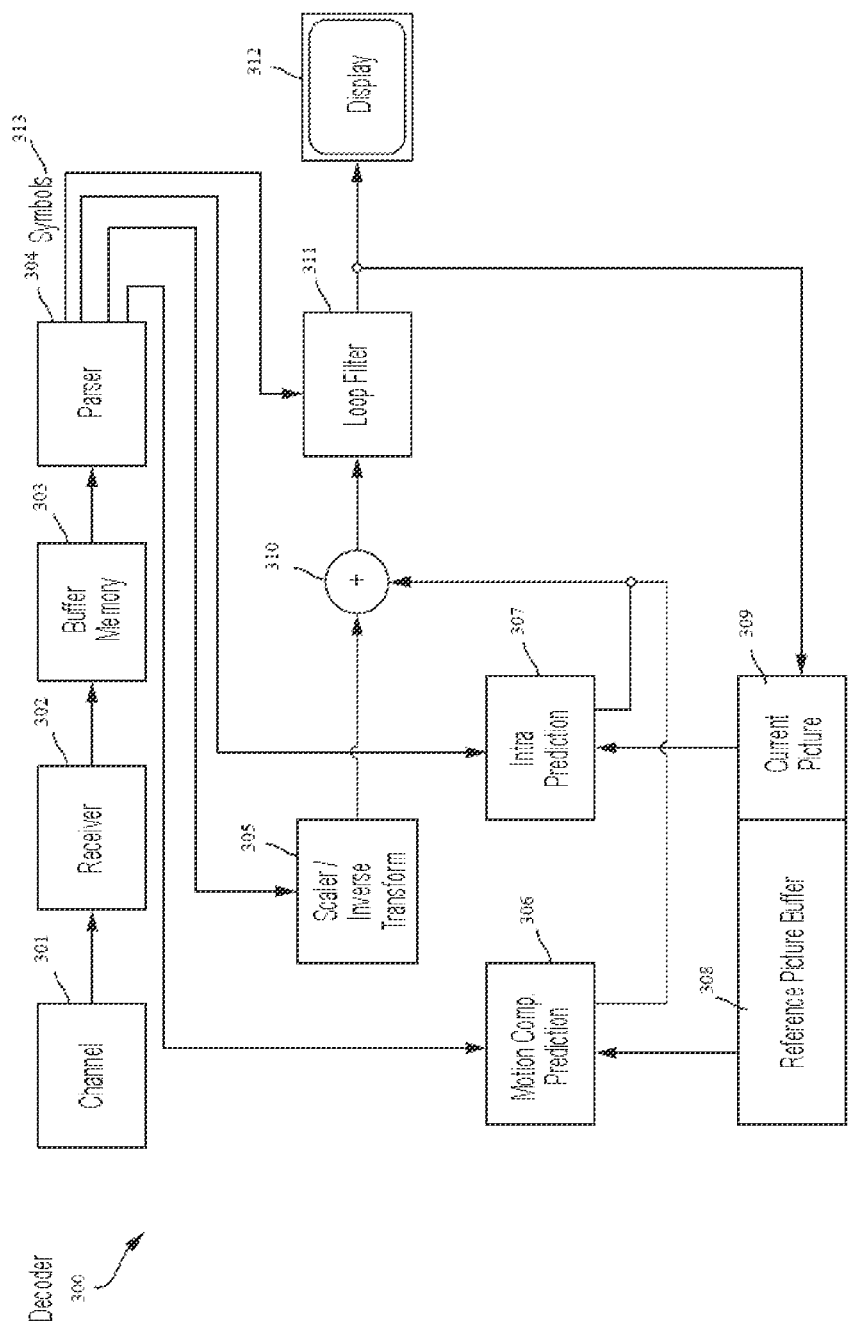
FIG. 3 is a simplified block diagram regarding decoders in accordance with embodiments.

FIG. 3 may be a functional block diagram of a video decoder 300 according to an embodiment of the present invention.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities (not depicted). The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosychronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information parameter set fragments (not depicted). The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 300 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the render device 312 as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 4:
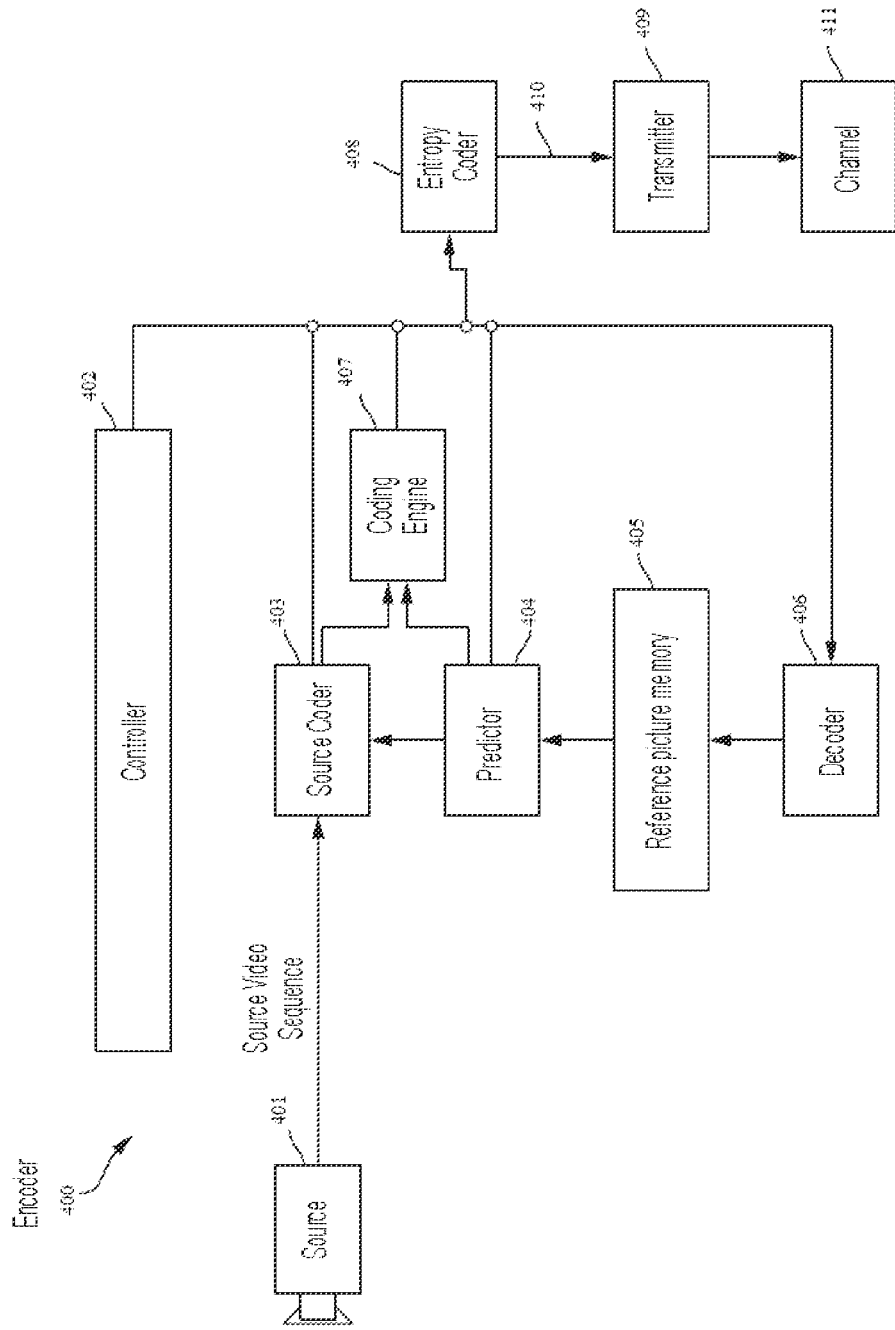
FIG. 4 is a simplified block diagram regarding encoders in accordance with embodiments.

FIG. 4 may be a functional block diagram of a video encoder 400 according to an embodiment of the present disclosure.

The encoder 400 may receive video samples from a video source 401 (that is not part of the encoder) that may capture video image(s) to be coded by the encoder 400.

The video source 401 may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 401 may be a storage device storing previously prepared video. In a videoconferencing system, the video source 401 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 400 may code and compress the pictures of the source video sequence into a coded video sequence 410 in real time or under any other time constraints as required by the application. Enforcing appropriate coding speed is one function of Controller 402. Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 402 as they may pertain to video encoder 400 optimized for a certain system design.

Some video encoders operate in what a person skilled in the art readily recognizes as a "coding loop." As an oversimplified description, a coding loop can consist of the encoding part of an encoder 402 ("source coder" henceforth) (responsible for creating symbols based on an input picture to be coded, and a reference picture(s)), and a (local) decoder 406 embedded in the encoder 400 that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory 405. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 406 can be the same as of a "remote" decoder 300, which has already been described in detail above in conjunction with FIG. 3. Briefly referring also to FIG. 4, however, as symbols are available and en/decoding of symbols to a coded video sequence by entropy coder 408 and parser 304 can be lossless, the entropy decoding parts of decoder 300, including channel 301, receiver 302, buffer 303, and parser 304 may not be fully implemented in local decoder 406.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 403 may perform motion compensated predictive coding, which codes an input frame predictively with reference to one or more previously-coded frames from the video sequence that were designated as "reference frames." In this manner, the coding engine 407 codes differences between pixel blocks of an input frame and pixel blocks of reference frame(s) that may be selected as prediction reference(s) to the input frame.

The local video decoder 406 may decode coded video data of frames that may be designated as reference frames, based on symbols created by the source coder 403. Operations of the coding engine 407 may advantageously be lossy processes. When the coded video data may be decoded at a video decoder (not shown in FIG. 4), the reconstructed video sequence typically may be a replica of the source video sequence with some errors. The local video decoder 406 replicates decoding processes that may be performed by the video decoder on reference frames and may cause reconstructed reference frames to be stored in the reference picture cache 405. In this manner, the encoder 400 may store copies of reconstructed reference frames locally that have common content as the reconstructed reference frames that will be obtained by a far-end video decoder (absent transmission errors).

The predictor 404 may perform prediction searches for the coding engine 407. That is, for a new frame to be coded, the predictor 404 may search the reference picture memory 405 for sample data (as candidate reference pixel blocks) or certain metadata such as reference picture motion vectors, block shapes, and so on, that may serve as an appropriate prediction reference for the new pictures. The predictor 404 may operate on a sample block-by-pixel block basis to find appropriate prediction references. In some cases, as determined by search results obtained by the predictor 404, an input picture may have prediction references drawn from multiple reference pictures stored in the reference picture memory 405.

The controller 402 may manage coding operations of the video coder 403, including, for example, setting of parameters and subgroup parameters used for encoding the video data.

Output of all aforementioned functional units may be subjected to entropy coding in the entropy coder 408. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 409 may buffer the coded video sequence(s) as created by the entropy coder 408 to prepare it for transmission via a communication channel 411, which may be a hardware/software link to a storage device which would store the encoded video data. The transmitter 409 may merge coded video data from the video coder 403 with other data to be transmitted, for example, coded audio data and/or ancillary data streams (sources not shown).

The controller 402 may manage operation of the encoder 400. During coding, the controller 405 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder 400 may perform coding operations according to a predetermined video coding technology or standard, such as ITU-T Rec. H.265. In its operation, the video coder 400 may perform various compression operations, including predictive coding operations that exploit temporal and spatial redundancies in the input video sequence. The coded video data, therefore, may conform to a syntax specified by the video coding technology or standard being used.

In an embodiment, the transmitter 409 may transmit additional data with the encoded video. The source coder 403 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 5:
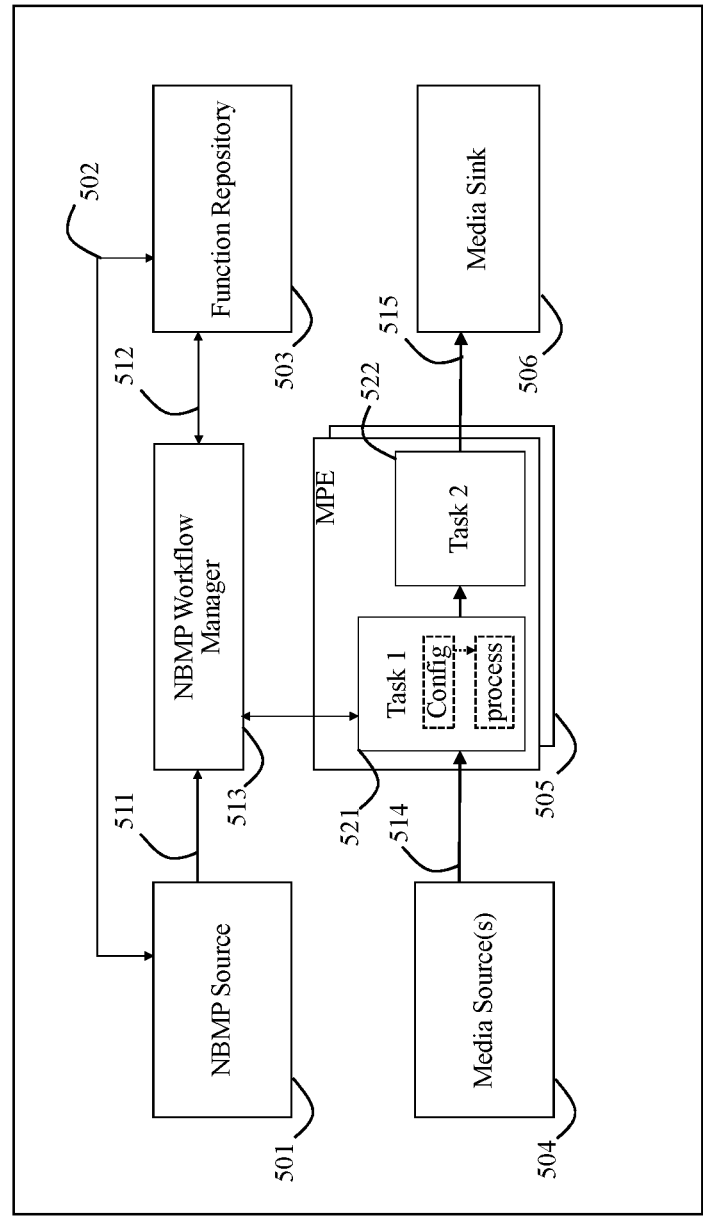
FIG. 5 is a simplified block diagram regarding encoders in accordance with embodiments.

FIG. 5 illustrates an MPEG Network-Based Media Processing (NBMP) architecture 500 according to embodiments herein and may be implemented with respect to cloud processing such that a quality of dividing a workflow among different network entities, MPEs, sources, or sinks may be determined and utilized thus leveraging the public, private or hybrid cloud services as described below. The NBMP architecture 500 includes an NBMP source 501 which provides an NBMP workflow API and workflow description 511 to an NBMP workflow manager 513. The NBMP workflow manager 513 can communicate a function discover API and function description 512 with a function repository 503, and the function repository 503 can also communicate a function discovery API and function description 502 with the NBMP source 501.

Additionally in FIG. 5, the NBMP workflow manager can communicate, such as a NBMP task API and task reporting a current task status and configuration, with the media processing entity (MPE) 505 which may operate as a runtime configuration/stream/event binding entity. For example, a media source 504 may provide one or more media flows 514 to one or more tasks 521 and 522 of the MPE 505 which also may be parallelized for plural media flows 514 respectively. The MPE 505 may communicate the one or more media flows 515 to the media sink 506.

Additionally, in FIG. 5, the communications between the NBMP source 501, the NBMP Workflow Manager 513, the function repository 503 and the MPE 505 may be considered a control flow, and the communications between the media source 504, the MPE 505, and the media sink 506 may be considered a data flow.

According to exemplary embodiments, the inputs and outputs of a Workflow description 511 are described by input and output descriptors, and according to exemplary embodiments, an interconnection between function instances of a workflow may be defined in a connection-map array of a processing descriptor such that corresponding objects are shown in Tables 1-3 below:

TABLE 1

Input Descriptor

| Name | Type | Cardinality |
|---|---|---|
| media-parameters | Array of object | 0-1* |
| metadata-parameters | Array of object | 0-1* |

*This Descriptor shall contain at least one of the above objects.

TABLE 2

Output Descriptor

| Name | Type | Cardinality |
|---|---|---|
| media-parameters | Array of object | 0-1* |
| metadata-parameters | Array of object | 0-1* |

*This Descriptor shall contain at least one of the above objects.

TABLE 3 connection-map array element

| Name | Description | Type | Cardinality |
|---|---|---|---|
| from | specifies Task/Function's id and port names from which the connection is | O | 1 |
| to | specifies Task/Function's id and port names to which the connection is | O | 1 |
| flowcontrol-parameters | contains flow control parameters for the connection. The elements of this objects shall be described using flowcontrol-requirements. | O | 0-1 |
| co-located | Specifies the deployment of the 2 connected tasks. When the value is True, the 2 tasks shall be deployed into the same MPE, Otherwise, the deployment is determined by the Workflow Manager based on available resources. The default is 'false'. | P | 0-1 |
| other-parameters | contains any other properties or parameters defined for the DAG edge, e.g. references to the Requirement Descriptor. The elements of this objects shall be described using generic parameter representation of subclause 9.20.1.1 | O | 0-1 |

Objects from and to are defined in Table 4 according to exemplary embodiments:

TABLE 4

"from" and "to" objects

| Name | Description | Type | Cardinality |
|---|---|---|---|
| id | Function identifier | P | 1 |
| instance | Instance identifier | P | 1 |
| port-name | Function logic port name. It shall be output port name for "from" and input port name for "to" in connection-map object | P | 1 |
| input-restrictions | Restrictions to the Input Descriptor parameters as predefined. This object shall not be present in "from" objects. | O | 0-1 |
| output-restrictions | Restrictions to the Output Descriptor parameters as predefined. This object shall not be present in "to" objects. | O | 0-1 |

Figure 6:
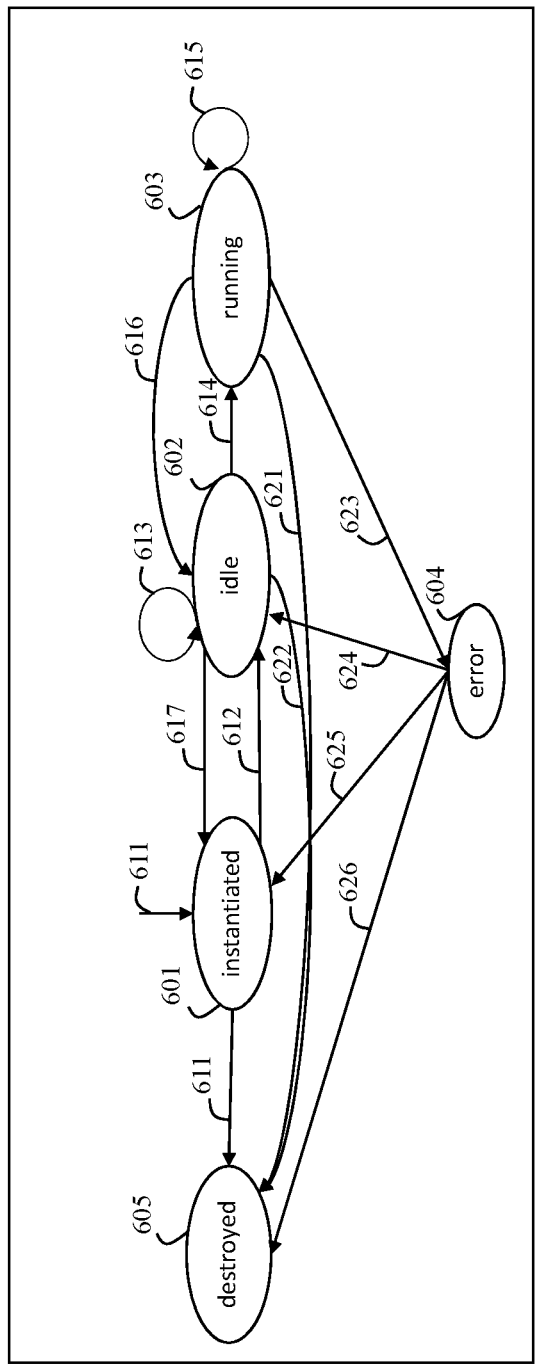
FIG. 6 is a simplified state diagram regarding encoders in accordance with embodiments.

FIG. 6 illustrates a task life cycle state diagram 600 according to exemplary embodiments. For example, an onInstantiation signal 611 may be received to the instantiated state 601. The instantiated state 601 may transition to the idle state 602 by an onTaskConfiguration signal 612, and the idle state 602 may transition back to the instantiated state 601 by an onReset signal 617. The idle state 602 may also loop by an onTaskConfiguration signal 613, and may also transition to a running state 603 by an onStart signal 614. The running state 603 may loop by an onTaskConfiguration signal 615 and may transition to the idle state 602 by an onStop signal and/or onCompletion signal 616. The running state 603 may also transition to the error state 604 by an onError signal 623, and the error state 604 may transition to the idle state 602, the instantiated state 601, and the destroyed state 605 by an onErrorHandling signal 624, and onReset signal 625, and an onTermination signal 626 respectively. Additionally, the running state 603, the idle state 602, and the instantiated state 601 may each transition to the destroyed state 605 by an onTermination signal 621, and onTermination signal 622 and an onTermination signal 611 respectively.

According to exemplary embodiments, an onStop and an onCompletion signal may also be added. For example, an onStop signal may indicate, when media data or metadata stops arriving to the MPE 505, for example, a Task 521 and/or Task 522 shall transition its state from the running state 603 to the idle state 602. Further for example, an onCompletion signal may indicate, when the processing is completed, such as at MPE 505, a Task 521 and/or Task 522 shall transition its state from running state 603 to the idle state 602. According to exemplary embodiments, such features are not only presented for the MPE 505 but also at least those states, running state 603 to/from the idle state 602, transitions may also be provided for the workflow manager 513.

According to exemplary embodiments, an NBMP input descriptor and parameters may be provided and enhanced using a timeout parameter (such as by an exemplary addition of a timeout to the input descriptor) such as described with respect to the following Tables 5-7:

TABLE 5

Input media-parameters objects

| Name | Type | Cardinality |
| --- | --- | --- |
| stream-id | P | 1 |
| name | P | 1 |
| keywords | P | 1 |
| mime-type | P | 1 |
| video-format | P | 0-1 |
| audio-format | P | 0-1 |
| image-format | P | 0-1 |
| codec-type | P | 0-1 |
| protocol | P | 1 |
| throughput | P | 0-1 |
| buffersize | P | 0-1 |
| caching-server-url | P | 1 |

TABLE 6

Input metadata-parameters objects

| Name | Type | Cardinality |
| --- | --- | --- |
| stream-id | P | 1 |
| name | P | 1 |
| keywords | P | 1 |
| mime-type | P | 1 |
| codec-type | P | 0-1 |
| protocol | P | 1 |
| max-size | P | 0-1 |
| min-interval | P | 0-1 |
| caching-server-url | P | 0-1 |
| scheme-uri | P | 0-1 |
| timeout | P | 0-1 |

The timeout parameter may be defined, according to embodiments, as in Table 7:

TABLE 7

Input time out parameters

| Name | Definition | Unit | Type | Valid range |
| --- | --- | --- | --- | --- |
| timeout | time-interval for which if no data is received at this input, the input is considered complete (no additional data is received at this input. | milli-seconds | number | unsigned integer |

Figure 7:
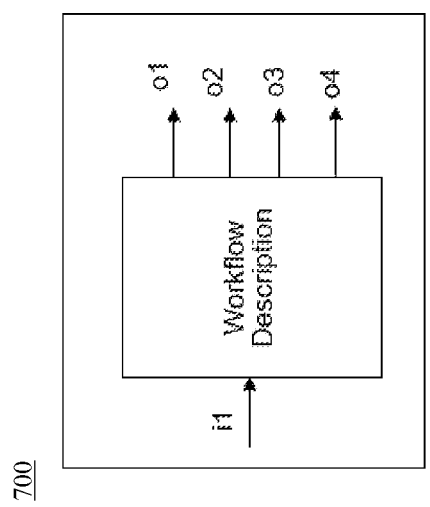
FIG. 7 is a simplified block diagram regarding pictures in accordance with embodiments.
Figure 8:
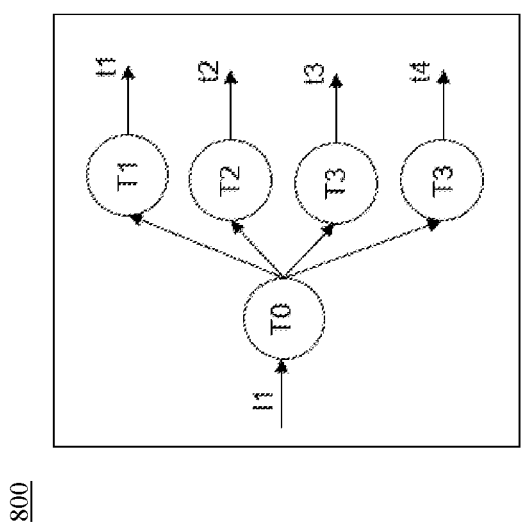
FIG. 8 is a simplified block diagram regarding encoders in accordance with embodiments.

FIG. 7 illustrates an exemplary embodiment of a workflow descriptor 700 having an input i1 and multiple outputs o1, o2, o3, and o4, though such number of inputs and outputs may be changed according to embodiments. Similarly, FIG. 8 illustrates an exemplary embodiment of a task diagram 800 having a task T0 with an input I1 split into multiple tasks T1, T2, T3, and another T3 having outputs t1, t2, t3, and t4 respectively though such number of inputs and outputs may be changed according to embodiments. However, viewing the workflow descriptor 700 and the task diagram 800, there is a technical problem with respect to a lack of description for the association between (o1,o2,o3,o4) and (t1,t2,t3,t4). As such, embodiments may reference and rely on the information provided in the following tables 8 and 9:

TABLE 8 connection-map array element

| Name | Description | Type | Cardinality |
| --- | --- | --- | --- |
| from | specifies Task/Function's id and port names from which the connection is | O | 1 |
| to | specifies Task/Function's id and port names to which the connection is | O | 1 |
| flowcontrol-parameters | contains flow control parameters for the connection. The elements of this objects shall be described using flowcontrol-requirements. | O | 0-1 |
| co-located | Specifies the deployment of the 2 connected tasks. When the value is True, the 2 tasks shall be deployed into the same MPE, Otherwise, the deployment is determined by the Workflow Manager based on available resources. The default is 'false'. | P | 0-1 |
| other-parameters | contains any other properties or parameters defined for the DAG edge, e.g. references to the Requirement Descriptor. The elements of this objects shall be described using generic parameter representation of subclause 9.20.1.1 | O | 0-1 |

According to embodiments, objects from and to are defined in Table 9 and may replace definitions previously provided in Table 3.

TABLE 9

"from" and "to" objects

| Name | Description | Type | Cardinality |
| --- | --- | --- | --- |
| id | Function identifier | P | 1 |
| instance | Instance identifier | P | 1 |
| port-name | Function logic port name. It shall be output port name for "from" and input port name for "to" in connection-map object Restrictions to the Input Descriptor parameters as predefined. | P | 1 |
| input-restrictions | This object shall not be present in "from" objects. | O | 0-1 |
| output-restrictions | Restrictions to the Output Descriptor parameters as predefined. This object shall not be present in "to" objects. | O | 0-1 |

Figure 9:
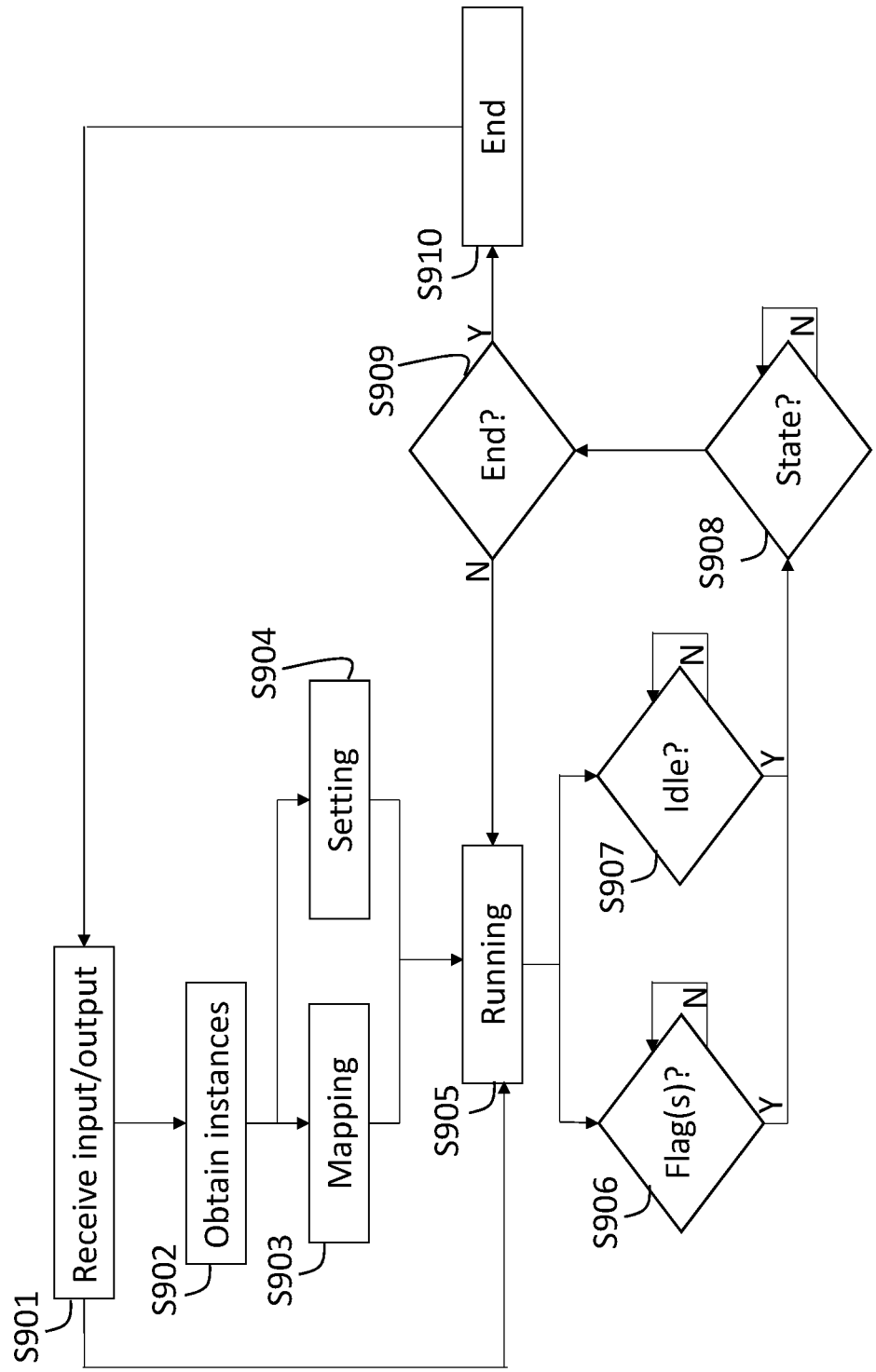
FIG. 9 is a simplified flow chart in accordance with embodiments.

FIG. 9 illustrates a simplified flowchart 900 according to exemplary embodiments. At S901 there is a reception of inputs and outputs information.

At S902 there is an obtaining of instances. For example, there may be an obtaining of one or more inputs and or outputs of one or more of any of a task and a workflow.

At S903, there is a mapping. The connections between the function instances among the examples described with respect to FIGS. 7 and 8 may be defined; however, as a technical problem, it may not be clear which input of the workflow is associated with a specific function instance's input and which output of the workflow is associated to a specific function instance's output. This may be due to a fact that a connection-map may only have defined the connections between functions and not between function instances and the workflow's inputs/outputs. If the workflow inputs/outputs are different, among all first or last functions, then the workflow manager 513 can find the association due to the uniqueness of each input/output between all inputs/output, but if the workflow includes multiple inputs/outputs with the same description (which only differ in their stream-id), then there is an ambiguity to identify the right function input/output for a workflow's input/output. In other words, there is an ambiguity of assigning the workflow inputs and outputs to specific functions inputs and outputs. An example of such a case is shown in the FIGS. 7 and 8 which is addressed by the technical solutions herein.

For example, at S903, embodiments include the workflow input/outputs in a connection-map, i.e. a connection map shall include all inputs and outputs of the workflow. For example, a port-name may be used as function id and a stream-id may be used as an instance. Further for example, the following text, or the like, may be included to Table 8:

The array of connection-map object describes the media workflow DAG, i.e. the connection information between different tasks in the graph. Each element in this array, which represents an edge in the DAG, is defined in Table 8 and may replace definitions in Table 3.

Further, according to exemplary embodiments, Table 8 shall also include all the input-ports and output ports of a General Descriptor in form of "from" and "to" objects respectively (one "from" object per input port and one "to" object per output port) for example, and the "id" and "port-name" for each corresponding workflow input/output shall be set to the corresponding 'port-name' and 'stream-id' of the corresponding input-port/output-port of the General Descriptor. Note that for such connection, the flow-control parameters, collocated flag, and other parameters may be ignored and, in such exemplary embodiments, are not therein included.

As such, at S903, there is a determining whether the input of the at least one of the task and the workflow is to be associated to at least one of an input and an output of a function, and an associating, in response to determining that the input of the at least one of the task and the workflow is to be associated with the at least one of the input and the output of the function, the input of the at least one of the task and the workflow with the at least one of an input and an output of a function. This may also be with respect to obtaining a plurality of inputs, including the input, of the at least one of the task and the workflow, such that there is a determining whether each of the inputs of the at least one of the task and the workflow is to be respectively associated to at least one of inputs and outputs of one or more functions respectively, and also a respective associating, based on determining whether each of the inputs of the at least one of the task and the workflow is to be respectively associated to at least one of inputs and outputs of one or more functions respectively, of the inputs of the at least one of the task and the workflow with the at least ones of the inputs and the outputs of the one or more functions. For example, such determining, according to exemplary embodiments, may be include determining whether each of the inputs of the at least one of the task and the workflow is to be respectively associated to at least one of inputs and outputs of one or more functions respectively comprises determining at least ones of an identification and a port name for each of the inputs of the at least one of the task and the workflow and at least ones of a corresponding port name and a stream identification of at least ones of a corresponding input port and output port.

At S904, there is a setting, for example a setting of a timeout for any of the inputs of the at least one of the task and the workflow. The S904 and S903 features may be implemented in parallel or in sequence, and as such, there is herein disclosed a method for the association of each workflow input and output to each relevant individual function's input and output, wherein each input or output of the workflow is connected to one of the function instances'/task's input or output of the workflow using the connection-map graph, wherein each input and output can be identified unambiguously which represents a technical solution to the above-noted technical problems.

At S905, there is a running of operations, such as one or more tasks. However, as additional technical problems, a task or workflow may not be able to decide whether the data in its input is complete or not. So statements in the NBMP specification such as "onStop, when media data or metadata stops arriving, Task shall transition its state from the running state to the idle state" may be technically insufficient as a task or workflow may not have any rule for deciding whether the data is stopped.

As such, according to exemplary embodiments, there are technical solutions to such problems such as that for a task or workflow to realize if the input is stopped arriving, there is defined two added parameters for each input: "Timeout: the time interval that if data is not received in an input, the input data is considered completed," and "Complete: an input flag that if it is set to 'true', it means that no further data is arriving in this input and then input data may be considered completed" and as such, a the timeout parameter may set by the NBMP Source for an input of a workflow or set by Workflow Manager for an input of a task at S904. Then, the workflow or task may observe the input and as soon as no data arrived in for a duration of Timeout, then may concludes that the data has stopped.

At S906, there is a consideration if one or more flags has been received, and if not, then the processing may continue to check for such one or more flags. Accordingly, at S906 there may be consideration whether at the complete input there is a flag for input that when the media source or the connecting task does not have any data, sets this flag to 'true' so that the workflow or tasks knows it will not receive any additional data for this input. As such, in Table 6 above, there is a technical advantage to the added NBMP input descriptor and parameters as enhanced by using a timeout parameter. Therefore, there may be a complete flag for input such that for each media or metadata input, each function can define an input parameter, and the parameter "complete flag" may be defined as if set to 'true', the input is complete, i.e. no additional data is received at this input. At S907, there is a consideration whether there is an idle state, and if not, then the processing may continue to check for such state. At S908, there is a consideration whether to change a state, and if not, then the processing may continue whether to change such state. At S909, there is a consideration whether to end processing, and if not, then the processing may continue running. At S910, there is an end of such processing, and then a proceeding to S901 to wait for further reception of any of inputs and outputs. Accordingly, therein, there is a determining whether the at least one of the task and the workflow observes a lack of data of the input for a duration equal to the timeout, determining, in response to determining that the at least one of the task and the workflow observed the lack of data of the input for the duration equal to the timeout, an unavailability of further data of the input, determining whether a state of the at least one of the task and the workflow is set to a running state, and determining, in a case where it is determined that the state is set to the running state, whether to change the state from the running state to an idle state based on whether the at least one of the task and the workflow observes the lack of data of the input for a duration equal to the timeout. There may also be a determining whether the input comprises an indication, and a determining, in response to determining that the input comprises the indication, the unavailability of further data of the input. Such indication may include a complete input flag included with the input of the at least one of the task and the workflow or may be provided as metadata provided with the input of the at least one of the task and the workflow.

Additionally, there may be further enhancements by a change of state, such as among those in FIG. 6 based on a timeout parameter and a complete flag determined at any of S906 and S907, such as at S908 with respect to considering whether there is any of an "onStop, when all media data or metadata stops arriving (by either observing timeout values or complete flag set to 'true', or any combination of these two, in all inputs and completing processing the received inputs), shall transition the state from running state to idle state" or the like and an "onCompletion, when the processing is completed (by either observing timeout values or complete flag set to 'true', or any combination of these two, in all inputs and completing processing the received inputs), shall transition the state from running state to idle state" or the like. According to exemplary embodiments, such statements herein may be applied to any of, including both of, tasks and workflows. As such, with respect to obtaining a plurality of inputs at S901, including the input, of the at least one of the task and the workflow, there may also be a in response to any of S906 and S907 or stand-alone at S908 determining whether a state of the at least one of the task and the workflow is set to a running state such as with respect to additional determining whether all of the inputs of the at least one of the task and the workflow observes the lack of data of all of the inputs for the duration equal to the timeout, such as at S907, and determining, in a case where it is determined that the state is set to the running state at S908, whether to change the state from the running state to an idle state based on whether the at least one of the task and the workflow observes the lack of data of the input for a duration equal to the timeout for all of the inputs based on results of any of S906 and S907. For example, determining whether all of the inputs of the at least one of the task and the workflow observes the lack of data of all of the inputs for the duration equal to the timeout may be by determining whether at least one of the inputs of the at least one of the task and the workflow indicates any of a timeout indication at S907 and/or a complete indication at S906.

As such, there is a technical advantage to such features which offer a method of setting a timeout for each input of a task or workflow, so that if the task or workflow doesn't observe any data in its corresponding input for a duration equal to the timeout, the task or workflow may conclude no more data is available for that input, a method of signaling no additional input data is available using a complete input flag for input for media, metadata or any other input so that the data sending entity can inform a task or a workflow that there will be no data sent to this input, and therefore the task or workflow may conclude no more data will arrive, and a method of changing a task or workflow state from running to idle based on observing the timeouts for all inputs and all complete flags of all its inputs, and if all of the task or workflow inputs are either in timeout or complete state, then the task or workflow should change its state from running to idle which would otherwise not have been available in view of such technical problems, such as at least with NBMP implementation, that are advantageously solved as described by embodiments herein.

Therefore, based on any updates with respect to the S906-S909 described above, at S905 there may be an applying of an update to the at least one of the task and the workflow in NBMP based on determining the unavailability of further data of the input such that processing of the at least one of the task and the workflow in NBMP proceeds based on the update.

The techniques described above, can be implemented as computer software using computer-readable instructions and physically stored in one or more computer-readable media or by a specifically configured one or more hardware processors. For example, FIG. 10 shows a computer system 1000 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 10:
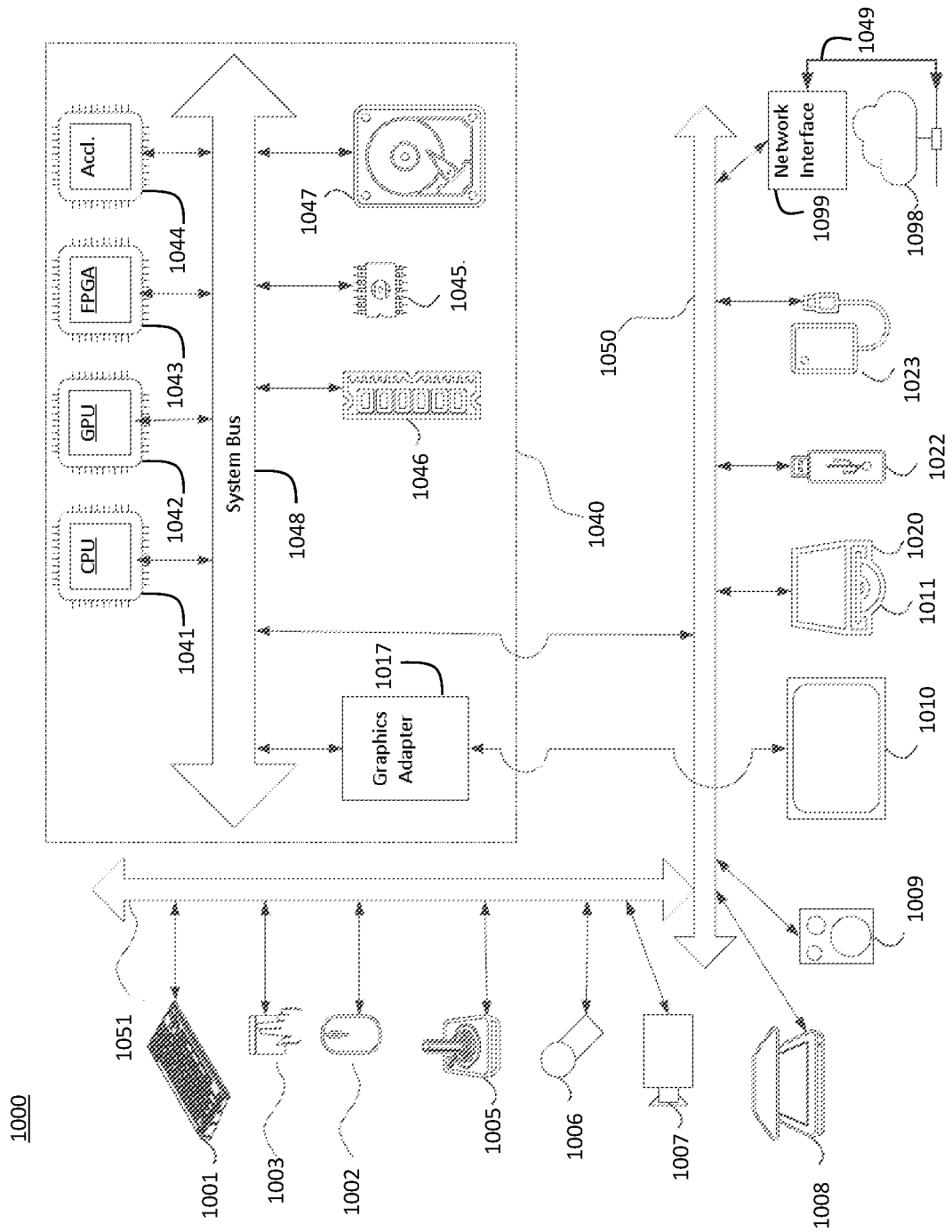
FIG. 10 is a schematic illustration in accordance with embodiments.

The components shown in FIG. 10 for computer system 1000 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1000.

Computer system 1000 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1001, mouse 1002, trackpad 1003, touch screen 1010, joystick 1005, microphone 1006, scanner 1008, camera 1007.

Computer system 1000 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1010, or joystick 1005, but there can also be tactile feedback devices that do not serve as input devices), audio output devices (such as: speakers 1009, headphones (not depicted)), visual output devices (such as screens 1010 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1000 can also include human accessible storage devices and their associated media such as optical media including CD/DVD ROM/RW 1020 with CD/DVD 1011 or the like media, thumb-drive 1022, removable hard drive or solid state drive 1023, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1000 can also include interface 1099 to one or more communication networks 1098. Networks 1098 can for example be wireless, wireline, optical. Networks 1098 can further be local, wide-area, metropolitan, vehicular and industrial, real-time, delay-tolerant, and so on. Examples of networks 1098 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 1098 commonly require external network interface adapters that attached to certain general-purpose data ports or peripheral buses (1050 and 1051) (such as, for example USB ports of the computer system 1000; others are commonly integrated into the core of the computer system 1000 by attachment to a system bus as described below (for example Ethernet interface into a PC computer system or cellular network interface into a smartphone computer system). Using any of these networks 1098, computer system 1000 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1040 of the computer system 1000.

The core 1040 can include one or more Central Processing Units (CPU) 1041, Graphics Processing Units (GPU) 1042, a graphics adapter 1017, specialized programmable processing units in the form of Field Programmable Gate Areas (FPGA) 1043, hardware accelerators for certain tasks 1044, and so forth. These devices, along with Read-only memory (ROM) 1045, Random-access memory 1046, internal mass storage such as internal non-user accessible hard drives, SSDs, and the like 1047, may be connected through a system bus 1048. In some computer systems, the system bus 1048 can be accessible in the form of one or more physical plugs to enable extensions by additional CPUs, GPU, and the like. The peripheral devices can be attached either directly to the core's system bus 1048, or through a peripheral bus 1051. Architectures for a peripheral bus include PCI, USB, and the like.

CPUs 1041, GPUs 1042, FPGAs 1043, and accelerators 1044 can execute certain instructions that, in combination, can make up the aforementioned computer code. That computer code can be stored in ROM 1045 or RAM 1046. Transitional data can be also be stored in RAM 1046, whereas permanent data can be stored for example, in the internal mass storage 1047. Fast storage and retrieval to any of the memory devices can be enabled through the use of cache memory, that can be closely associated with one or more CPU 1041, GPU 1042, mass storage 1047, ROM 1045, RAM 1046, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1000, and specifically the core 1040 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1040 that are of non-transitory nature, such as core-internal mass storage 1047 or ROM 1045. The software implementing various embodiments of the present disclosure can be stored in such devices and executed by core 1040. A computer-readable medium can include one or more memory devices or chips, according to particular needs. The software can cause the core 1040 and specifically the processors therein (including CPU, GPU, FPGA, and the like) to execute particular processes or particular parts of particular processes described herein, including defining data structures stored in RAM 1046 and modifying such data structures according to the processes defined by the software. In addition or as an alternative, the computer system can provide functionality as a result of logic hardwired or otherwise embodied in a circuit (for example: accelerator 1044), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for network based media processing (NBMP), the method comprising:
   obtaining an input of at least one of a task and a workflow in NBMP;
   setting a timeout for the input of the at least one of the task and the workflow;
   determining whether the at least one of the task and the workflow observes a lack of data of the input for a duration equal to the timeout;

determining, in response to determining that the at least one of the task and the workflow observed the lack of data of the input for the duration equal to the timeout, an unavailability of further data of the input;

determining whether each of inputs, including the input, of the at least one of the task and the workflow is to be respectively associated to at least one of inputs and outputs of one or more functions respectively by determining at least ones of an identification and a port name for each of the inputs of the at least one of the task and the workflow and at least ones of a corresponding port name and a stream identification of at least ones of a corresponding input port and output port;

respectively associating, based on determining whether each of the inputs of the at least one of the task and the workflow is to be respectively associated to at least one of inputs and outputs of one or more functions respectively, the inputs of the at least one of the task and the workflow with the at least ones of the inputs and the outputs of the one or more functions;

applying an update to the at least one of the task and the workflow in NBMP based on determining the unavailability of further data of the input; and processing the at least one of the task and the workflow in NBMP based on the update.

2. The method according to claim 1, further comprising:
determining whether a state of the at least one of the task and the workflow is set to a running state; and
determining, in a case where it is determined that the state is set to the running state, whether to change the state from the running state to an idle state based on whether the at least one of the task and the workflow observes the lack of data of the input for a duration equal to the timeout.

3. The method according to claim 1, further comprising:
determining whether the input comprises an indication; and
determining, in response to determining that the input comprises the indication, the unavailability of further data of the input.

4. The method according to claim 3,
wherein the indication comprises a complete input flag included with the input of the at least one of the task and the workflow.

5. The method according to claim 3,
wherein the indication is included in metadata provided with the input of the at least one of the task and the workflow.

6. The method according to claim 3, further comprising:
obtaining the plurality of inputs, including the input, of the at least one of the task and the workflow;
determining whether a state of the at least one of the task and the workflow is set to a running state;
determining whether all of the inputs of the at least one of the task and the workflow observes the lack of data of all of the inputs for the duration equal to the timeout; and
determining, in a case where it is determined that the state is set to the running state, whether to change the state from the running state to an idle state based on whether the at least one of the task and the workflow observes the lack of data of the input for a duration equal to the timeout for all of the inputs.

7. The method according to claim 6,
wherein determining whether all of the inputs of the at least one of the task and the workflow observes the lack of data of all of the inputs for the duration equal to the timeout comprises determining whether at least one of the inputs of the at least one of the task and the workflow indicates any of a timeout indication and a complete indication.

8. An apparatus for network based media processing (NBMP), the apparatus comprising:
at least one memory configured to store computer program code;
at least one processor configured to access the computer program code and operate as instructed by the computer program code, the computer program code including:
obtaining code configured to cause the at least one processor to obtain an input of at least one of a task and a workflow in NBMP;
setting code configured to cause the at least one processor to set a timeout for the input of the at least one of the task and the workflow; and
determining code configured to cause the at least one processor to determine whether the at least one of the task and the workflow observes a lack of data of the input for a duration equal to the timeout;
wherein the determining code is further configured to cause the at least one processor to determine, in response to determining that the at least one of the task and the workflow observed the lack of data of the input for the duration equal to the timeout, an unavailability of further data of the input;
wherein the computer program code further comprises applying code configured to cause the at least one processor to apply an update to the at least one of the task and the workflow in NBMP based on determining the unavailability of further data of the input; and
wherein the computer program code further comprises processing code configured to cause the at least one processor to process the at least one of the task and the workflow in NBMP based on the update,
wherein the determining code is further configured to cause the at least one processor to determine whether each of inputs, including the input, of the at least one of the task and the workflow is to be respectively associated to at least one of inputs and outputs of one or more functions respectively by determining at least ones of an identification and a port name for each of the inputs of the at least one of the task and the workflow and at least ones of a corresponding port name and a stream identification of at least ones of a corresponding input port and output port;
wherein the computer program code further comprises associating code figured to cause the at least one processor to respectively associate, based on determining whether each of the inputs of the at least one of the task and the workflow is to be respectively associated to at least one of inputs and outputs of one or more functions respectively, the inputs of the at least one of the task and the workflow with the at least ones of the inputs and the outputs of the one or more functions.

9. The apparatus according to claim 8,
wherein the determining code is further configured to cause the at least one processor to determine, whether a state of the at least one of the task and the workflow is set to a running state, and
wherein the determining code is further configured to cause the at least one processor to determine, in a case where it is determined that the state is set to the running state, whether to change the state from the running state to an idle state based on whether the at least one of the task and the workflow observes the lack of data of the input for a duration equal to the timeout.

10. The apparatus according to claim 8,
wherein the determining code is further configured to cause the at least one processor to determine whether the input comprises an indication, and
wherein the determining code is further configured to cause the at least one processor to determine, in response to determining that the input comprises the indication, the unavailability of further data of the input.

11. The apparatus for according to 10,
wherein the indication comprises a complete input flag included with the input of the at least one of the task and the workflow.

12. The apparatus for according to claim 10,
wherein the indication is included in metadata provided with the input of the at least one of the task and the workflow.

13. The apparatus according to claim 10,
wherein the obtaining code is further configured to cause the at least one processor to obtain the plurality of inputs, including the input, of the at least one of the task and the workflow,
wherein the determining code is further configured to cause the at least one processor to determine whether a state of the at least one of the task and the workflow is set to a running state,
wherein the determining code is further configured to cause the at least one processor to determine whether all of the inputs of the at least one of the task and the workflow observes the lack of data of all of the inputs for the duration equal to the timeout, and
wherein the determining code is further configured to cause the at least one processor to determine, in a case where it is determined that the state is set to the running state, whether to change the state from the running state to an idle state based on whether the at least one of the task and the workflow observes the lack of data of the input for a duration equal to the timeout for all of the inputs.

14. The apparatus according to claim 13,
wherein determining whether all of the inputs of the at least one of the task and the workflow observes the lack of data of all of the inputs for the duration equal to the timeout comprises determining whether at least one of the inputs of the at least one of the task and the workflow indicates any of a timeout indication and a complete indication.

15. A non-transitory computer readable medium storing a program causing a computer to execute a process for network based media processing (NBMP), the process comprising:
obtaining an input of at least one of a task and a workflow in NBMP;
setting a timeout for the input of the at least one of the task and the workflow;
determining whether the at least one of the task and the workflow observes a lack of data of the input for a duration equal to the timeout;
determining, in response to determining that the at least one of the task and the workflow observed the lack of data of the input for the duration equal to the timeout, an unavailability of further data of the input;
determining whether each of inputs, including the input, of the at least one of the task and the workflow is to be respectively associated to at least one of inputs and outputs of one or more functions respectively by determining at least ones of an identification and a port name for each of the inputs of the at least one of the task and the workflow and at least ones of a corresponding port name and a stream identification of at least ones of a corresponding input port and output port;
respectively associating, based on determining whether each of the inputs of the at least one of the task and the workflow is to be respectively associated to at least one of inputs and outputs of one or more functions respectively, the inputs of the at least one of the task and the workflow with the at least ones of the inputs and the outputs of the one or more functions;
applying an update to the at least one of the task and the workflow in NBMP based on determining the unavailability of further data of the input; and
processing the at least one of the task and the workflow in NBMP based on the update.

\* \* \* \* \*